UNITED STATES PATENT OFFICE.

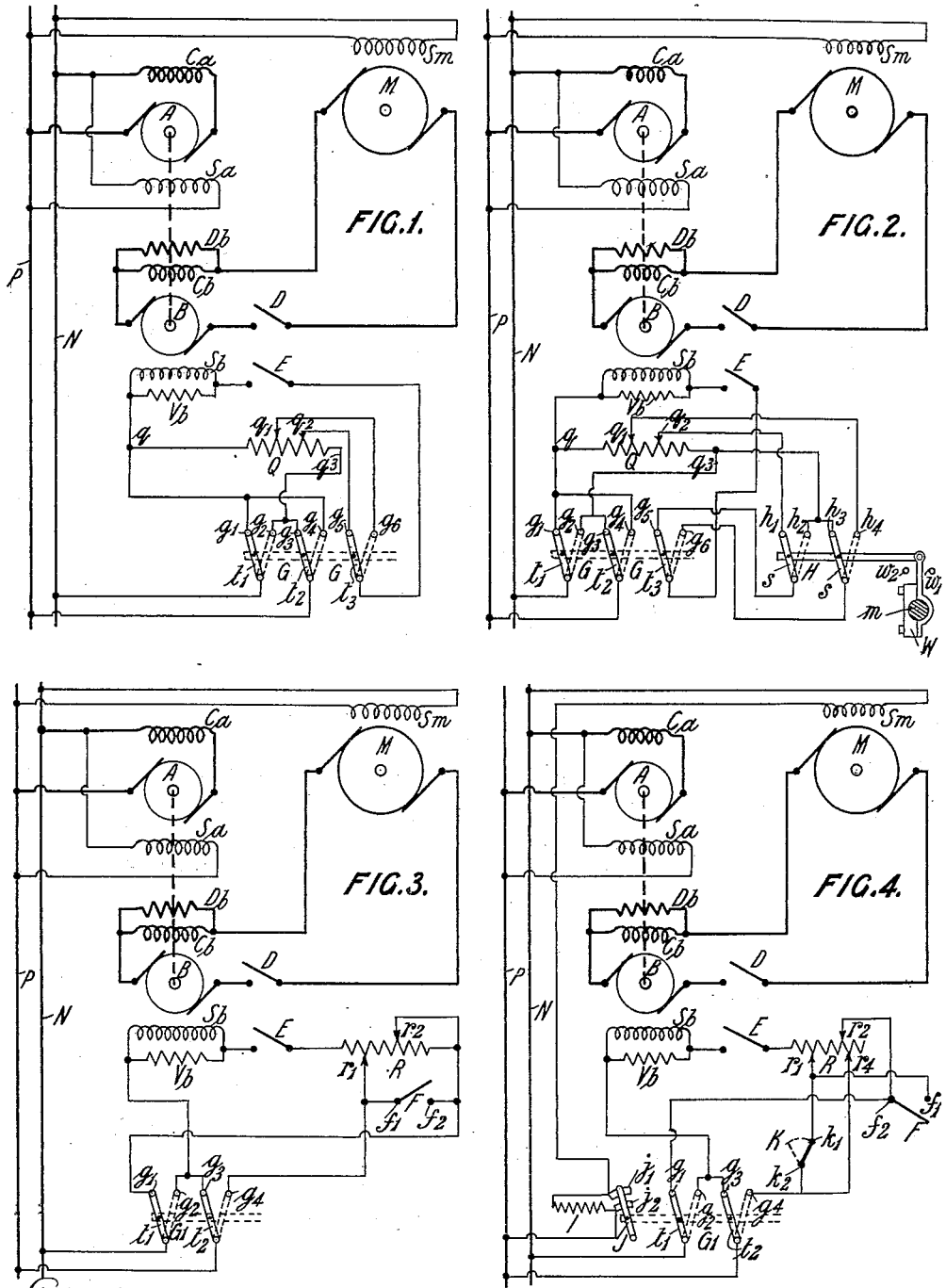

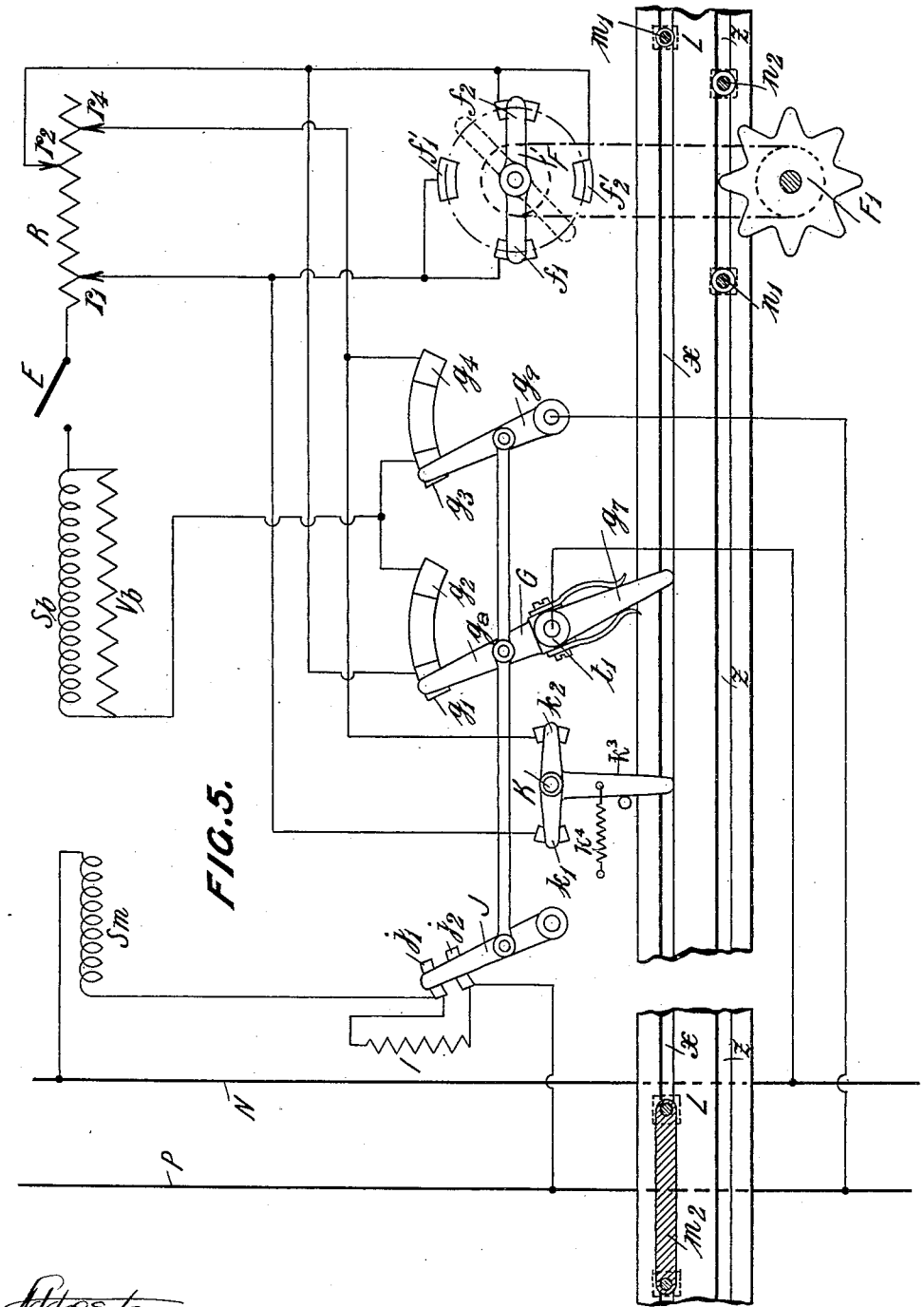

GEORGE ERIC MASON, OF TORONTO, CANADA.

ELECTRICALLY-DRIVEN PLANING-MACHINE.

1,089,658. Specification of Letters Patent. Patented Mar. 10, 1914.

Application filed September 6, 1910. Serial No. 530,657.

*To all whom it may concern:*

Be it known that I, GEORGE ERIC MASON, a subject of the King of Great Britain, and residing in Toronto, Canada, have invented certain new and useful Improvements in Electrically-Driven Planing-Machines, of which the following is a specification.

This invention relates to apparatus for electrically operating planing machines and the like reciprocating tools, and the object is to improve and simplify the construction of the controlling gear so that comparatively light switch gear may be employed; so that the stresses on the motor at reversal shall be minimized; so that the speed of the machine on the cutting stroke or on the return stroke may be easily varied; and so that the cutting stroke speed may be accelerated during non-cutting intervals.

According to the present invention I dispense with the armature series resistance and with both the reversing switch and the starting switch in the armature circuit of the driving motor, and also maintain the field strength of the driving motor approximately constant. This is accomplished by controlling and reversing the armature current of the driving motor by means of an auxiliary generator driven from the mains by an auxiliary motor; suitable switch gear, actuated by the machine which is to be driven, being provided to control the field of the auxiliary generator.

Apparatus for operating, say, a planing machine, according to this invention, would comprise:—the driving motor suitably geared to the planing machine, the field magnet winding of which motor is connected across the supply mains or other suitable and approximately constant source of potential; an auxiliary generator the armature of which is coupled in series with the armature of the driving motor and the field of which is controlled as to magnitude and sign by a switch actuated by the planing machine table; and an auxiliary motor energized from the supply mains and adapted to drive the auxiliary generator at a suitable speed in the one direction. The switch controlling the field of the auxiliary generator is so actuated by the planing machine table as to reverse the said field at the end of each stroke and to give relatively differing speeds for the cutting and return strokes respectively; the absolute values of the said speeds are also capable of adjustment so that suitable speeds may be set for various classes of work. The field of the auxiliary generator may be controlled by the switch in conjunction with a resistance connected after the manner of a potentiometer wire across the mains, the ends of the field winding being connected to suitable potential points in said resistance; the reversal of the field being effected by reversing the connections of the resistance, or by reversing the said potential points, and the relatively different speeds for the cutting and return strokes, respectively, of the planing machine being effected by having at one end of the resistance two alternative potential point terminals, one end of the field winding being connected, by means of the switch movement, to the one terminal for the one stroke, and to the other terminal for the other stroke. Any suitable absolute values for the speeds of the respective strokes may be obtained by adjusting the positions of the alternative potential points in the resistance. Or the field of the auxiliary generator may be controlled by the switch in conjunction with a resistance connected in series with the field winding, the relatively different speeds of the cutting and return strokes being obtained by having alternative terminals in the said resistance and connecting, by means of the switch movement, one end of the field winding to the one terminal for the one stroke, and to the other terminal for the other stroke; the field reversal being effected by reversing the connections.

The invention is illustrated in the accompanying drawings, in which—

Figure 1 shows diagrammatically the arrangement when the shunt of the generator of the motor generator is connected to the mains through a potentiometer form of resistance; Fig. 2 is a similar arrangement to Fig. 1 with the addition of the auxiliary switch; Fig. 3 shows the arrangement when the resistance in series with the shunt of the generator of the motor generator is a series resistance; Fig. 4 is similar to Fig. 3, with the addition of auxiliary switches. Fig. 5 shows diagrammatically the mode in which the reciprocating tool or the like operates the switches.

Throughout the drawings, the motor of the motor generator is indicated by the letter A, the generator of the motor generator by the letter B, and the motor geared to the reciprocating tool, by the letter M. The windings of these several machines are, in the case of series windings, indicated by the letter C, and in the case of shunt windings by the letter S, the windings belonging to the machine A being indicated by the addition of "a," those belonging to B by the addition of "b," and those belonging to M by the addition of "m."

Referring in the first instance to Fig. 1, the motor A is connected across the mains P N, the series winding $C^a$ being in the main circuit, and the shunt winding $S^a$ being connected across the mains. Suitable circuit switches and a suitable starting switch are, of course, fitted, but as there is nothing special in their construction, they are not illustrated. The generator B is mechanically connected with A, preferably by their shafts being coupled together, and its armature is connected in series with the armature of the motor M geared to the reciprocating tool. The field windings of B comprise, a series winding $C^b$ connected to the armature circuit, and a winding $S^b$ adapted to be connected as hereinafter described, through the switch G and a suitable resistance, to the mains P and N. A resistance $V^b$ is connected across the ends of the winding $S^b$, and a diverting resistance $D^b$ is connected across the end of the series winding $C^b$. The armature circuit of B and M is controlled by a switch D, and the field circuit of B is controlled by a switch E. The function of these switches D and E is to stop the machine tool without having to disconnect the motor A from the main circuit. The switch G is in the potentiometer resistance form, (Figs. 1 and 2), preferably a three-way, two pole throw-over switch having no midway "off" position, and its contacts $g^1$, $g^2$, $g^3$, $g^4$, $g^5$, $g^6$, are connected up to the winding $S^b$ and the resistance Q so that the latter is connected across the mains P and N, and so that one end of the winding $S^b$ is always connected to the end $q$ of the said resistance, and so that the other end of the winding is connected alternatively to adjustable points $q^1$ and $q^2$ in the said resistance. In the position of the switch shown in full lines, one end ($q$) of both the winding $S^b$ and the resistance Q, is connected through $g^1$ and the arm $t^1$ of the switch, to the main N, the other end of the shunt winding being connected through the switch E, the arm $t^3$ of the switch, and the contact $g^5$ of the switch, to the point $q^2$, the other end $q^3$ of the resistance Q being connected through the contact $g^3$ and switch arm $t^2$ to the main P. The winding $S^b$ is, in this position of the switch, impressed with a voltage corresponding with that between the main N and the potential point $q^2$ in the resistance Q, and this is the position of the switch corresponding with the quick (which is usually the return) stroke of the reciprocating tool. At the end of the quick or return stroke, the switch G is moved over into the position shown in dotted lines; the point $q$ at one end of $S^b$ is now connected to the main N through the contact $g^2$ and the arm $t^1$; $S^b$ is connected through E and the contact $g^6$ to the contact point $q^1$; it will be seen, therefore, that the movement of the switch into the dotted position, has not only reversed the connections of the winding $S^b$ across the mains, but has impressed upon it a potential corresponding with that between the main P and the potential point $q^1$ in the resistance $q$; that is to say, with a less potential than that which was given for the return stroke. The machine tool now makes its cutting stroke at a slower speed than the return stroke. The points $q^1$ and $q^2$ are adjustable in respect to the resistance Q, so that any desired absolute values may be given for the cutting and return stroke speeds, respectively. During a cutting stroke or a return stroke, the motor generator takes power from the mains P and N, and supplies power to the motor M. At the end of the stroke the switch G is operated and the connections reversed as described. The field of B does not, however, die away instantly, the time taken for it to die out depending upon the magnitude of the resistance $V^b$ connected as shown across $S^b$. As the field of B weakens in dying out, the E. M. F. of the machine B becomes less than the back E. M. F. of the motor M, which latter continues to be rotated in consequence of the inertia of the machine tool which it drives. The result therefore, is that M acts as a generator, and while the field of B is dying out, B acts as a motor and returns energy to the mains P and N through the machine A. The series winding $C^b$ is so arranged that when B acts as a generator it assists the winding $S^b$. When therefore B is motoring, and its armature current reversed, the winding $C^b$ would tend to weaken the field of B, and with a view of minimizing this effect, I provide a diverting resistance $D^b$ as a shunt to the winding $C^b$. When therefore M acts as a generator, the impedance of $D^b$ which is of course wound non-inductively, is considerably less than $C^b$, so that the motoring current passes chiefly through $D^b$. The provision of the diverting resistance $D^b$ also has the advantage of materially reducing the tendency to sparking at the brushes of B.

In the operating of reciprocating tools, it will be seen that the period during which the inertia of the reciprocating tool is used to return energy to the line, and the machine braked thereby, is, unlike that which obtains in the usual applications of a motor generator, a comparatively brief period. I find, however, that by fitting the resistance $V^b$ as a shunt to $S^b$, and $D^b$ as a shunt to $C^b$, and arranging the magnitude of $V^b$ to suit particular requirements, maximum advantage may be taken of the inertia of the machine when its direction of movement has to be changed; and moreover, that the tendency to spark is considerably reduced.

In Fig. 2, the arrangement of the machines A, B and M, and their field windings, is as already described in reference to Fig. 1; the action of the switch G is, however, supplemented by an auxiliary throw-over switch H, which may be a two way double pole switch; the four contacts $h^1$, $h^2$, $h^3$, $h^4$, of this switch are connected as follows:— $h^1$ is connected to $q^2$; $h^2$ and $h^3$ to $q^3$, and $h^4$ to $q^1$. The switch H is operated by any suitable frictional device on the motor shaft $m$, for instance by a frictional clutch W which is turned clockwise through a limited amount when the motor rotates in a clockwise direction, and which is turned in the opposite direction when the motor reverses its direction, its movement being limited by the two banking pins $w^1$ and $w^2$. A lever on W is connected to the switch arms by any suitable means. In the position shown in Fig. 2, the switches G and H are shown as they would be during the return stroke of the reciprocating tool, that is to say, the generator winding $S^b$ is connected across between $q$ and $q^2$. At the end of the return stroke, the switch G moves over into the position shown in dotted lines, reverses the connections, and connects $S^b$ across the points $q^3$ and $q$, thus giving it full voltage in the reverse direction. Immediately the direction of rotation of the motor is reversed, the friction device W moves clockwise, and pulls the switch H into the position shown in dotted lines in Fig. 2; this connects $S^b$ across $q^1$ and $q$, which is the correct position for the working stroke.

Referring now to Fig. 3, the arrangement of the machines A, B, and M, and their field windings, is the same as before. Instead, however, of using a resistance Q connected as a potentiometer, I use in this arrangement a resistance R arranged in series with the generator winding $S^b$. $r^1$ and $r^2$ are, as before, the adjustable potential points; in this case a two-way switch $G^1$ replaces the three-way switch G. The four contacts of $G^1$ are connected as follows:—$q^2$ and $q^3$ are connected to one end of the winding $S^b$; $q^4$ is connected to the potential point $r^1$, and $q^1$ to the potential point $r^2$, $t^1$ and $t^2$ being connected respectively to N and P. The position of the switch shown in full lines corresponds with the cutting stroke of the reciprocating tool, and it will be seen that when the switch is moved over to the dotted position, the connections across $S^b$ are reversed, one end of $S^b$ now being connected to the potential point $r^1$ in which there is less resistance in series with the winding, and a higher speed is therefore obtained for the return stroke. I find it an advantage to fit a supplementary switch F which, when closed, short circuits that portion of the resistance R between $r^1$ and $r^2$. This switch is used when, for instance, in a planing machine, a number of castings are being planed with a non-cutting interval between them; in such cases, tappets would be arranged on the planer, which would close the switch F during these non-cutting intervals, thereby accelerating the speed of the machine between the successive cuts; the normal cutting speed being, of course, resumed in consequence of the opening of the switch F by suitable tappets just before the tool again commences to cut. The positions of these tappets are, of course, adjustable.

In Fig. 4 the arrangement is similar to Fig. 3, but in this case an additional switch K is fitted. When the switch K is closed, the contact $q^4$ is connected to $r^1$; the object of the switch K is to effect a reversal more smoothly. The reciprocating tool is fitted with an advanced tappet which, just before the end of the return stroke, opens the switch K. The contact $q^4$ which, prior to the opening of K, was connected to $r^1$ to give a high return speed, is, by the opening of the switch K, connected to $r^4$, and this reduces the speed just prior to reversal. The switch K is returned to the position connecting $q^4$ to $r^1$ before the next return stroke. In Fig. 4 the switch F is shown, its connection being the same as described in the previous figures.

I have shown the generator B as being driven by an electro-motor A, and this is usually the most convenient plan.

The diverting resistance $D^b$ may, in some cases, be dispensed with, especially in the case of small machines.

The main switch G or $G^1$, and the auxiliary switches K and T are, in each case, preferably operated directly by tappet gear adjustably fixed to the reciprocating part L of the tool.

Fig. 5 shows, more or less diagrammatically, the mode of operating the switches by means of the reciprocating part L. The arms $g^8$, and $g^9$ of the switch G are connected together and are elastically connected to the arm $g^7$ pivoted on the spindle of $g^8$; $g^7$ is moved to the left, at the end of the working stroke by the piece $m^1$ which is adjustably fixed in the slot $x$ in, say, the planer bed L; $g^7$ is moved to the right, at the end of the return stroke, by the piece $m^2$, similarly fixed in the slot $x$. The switch F may be made a rotary switch and be rotated through steps of one-eighth of a revolution by being fixed on or geared to a toothed wheel $F^1$ having eight teeth; $F^1$ is rotated by pieces $n^1$, $n^2$ ... each of which in passing $F^1$ rotates it through one-eighth of a revolution; the pieces $n^1$, $n^2$ ... are adjustably fixed in a slot $z$ in the planer bed. In the position shown, $F^1$ having been turned by $n^1$, F joins the contacts $f^1$, $f^2$, and so short circuits the part of the resistance between $r^1$ and $r^2$, thus accelerating the speed during this part of the cutting stroke until the piece $n^2$ engages with $F^1$ and turns F into the position shown in dotted lines, after which normal cutting speed is resumed. The switch K has to be opened just before $m^2$ engages with $g^7$ at the end of the return stroke. This is effected by so arranging the tail $k^3$ of the lever which operates the switch K that it is turned in opposition to the spring $k^4$ by the piece $m^2$ which is long enough to retain the switch in the open position till after the reversal of the return stroke; soon after the cutting stroke has commenced, K is again closed ready for the next return stroke. The auxiliary motor is preferably shunt wound, and, as explained, matters are so arranged that at the end of each stroke of the planing machine, the driving motor utilizes the kinetic energy stored up in the moving parts, and supplies current to the generator which then acts as a motor, causing the auxiliary motor to generate and return energy to the mains. Where very high return stroke speeds are required, an auxiliary switch J may be arranged in conjunction with a resistance I adapted to be put in series with the winding $S^m$ of the motor M; the switch J is articulated to the switch $G^1$, (or it may be made part of the latter) so that when $G^1$ is in position for the working or cutting stroke, the switch J cuts out the resistance I, but when $G^1$ is moved to position for the return stroke, the resistance I is inserted in the winding $S^m$ of the motor M, so weakening the field of the latter, and its speed is increased both due to this cause and to the higher voltage of B.

The present invention has, in respect to the utilization of the kinetic energy stored up in the motor and planing machine table, considerable advantages over the arrangement in which but the one dynamo-electric machine is used for driving, in which case the kinetic energy stored up is largely wastefully absorbed in $C^2 R$ losses.

The resistance $V^b$, arranged as a shunt to the field winding $S^b$, is not fitted merely for the purpose of protecting the winding against high inductive voltages when the circuit of the shunt is broken, but as a means for regulating the time taken by the field to die out; when $V^b$ is made of high resistance, this time is short, the said time being increased when the resistance of $V^b$ is reduced; the duration of the said time controls the amount of regenerative action, and influences the sparking at the brushes of the generator during reversal, and the resistance of $V^b$ should be selected in each case to give the best results.

The switch F may be applied generally to electrically operated planing machines, to accelerate the speed during the non-operative portions of the working stroke; for instance, where the speed is varied by inserting resistance in the shunt or in the circuit of the driving motor, the said switch may be employed to cut in and cut out such resistance, so as to accelerate the speed as described.

The connections of the three machines, and the construction of the main and auxiliary switches may be modified, within the scope of the invention, to meet particular requirements.

The mode of construction shown is given by way of example; but it is to be understood that changes within the scope of the appended claims may be made to suit particular requirements.

Having now fully described my invention, what I claim and desire to secure by Letters Patent is;—

1. In combination with a reciprocating part, a motor, a generator supplying current to the motor, a field resistance, a switch adapted to reverse the generator field and change the magnitude of the said field resistance for the cutting and return strokes, respectively, of the reciprocating part of a machine tool, and means on the reciprocating part adapted when the movement of the latter has to be reversed to operate the said switch; an auxiliary switch adapted to change the magnitude of the generator field resistance, and adjustable means on the reciprocating part independent of the first mentioned means, and adapted to operate said auxiliary switch during the cutting stroke, substantially as described.

2. In combination with a reciprocating part, a motor, a generator supplying current to the motor, a generator field resistance, the source of potential and the reversing switch;—an auxiliary switch adapted to short-circuit a part of the resistance, a star wheel operating the switch, and pieces adjustably fixed to said reciprocating part actuating the star wheel; substantially as described.

3. In combination with a reciprocating part of a machine tool, a generator supplying current to a motor, a generator field resistance, a source of potential and a field controlling and reversing switch; an auxiliary switch normally closed and when closed adapted to short circuit the field resistance to one contact of the reversing switch, and means on the reciprocating part adapted to open the said auxiliary switch just before the end of the return stroke, substantially as described.

4. In combination with a reciprocating part, a motor, a generator supplying current to the motor, a generator field resistance connected at one end to the generator field winding;—a two-part two-way reversing switch, operated by the reciprocating part, said switch having two arms connected to a source of potential, and having contacts two connected to one end of the field winding and the other two contacts connected to different points in the field resistance; substantially as described.

5. In combination with a reciprocating part, a motor, a generator supplying current to the motor, a generator field resistance connected at one end to the generator field winding;—a two-part two-way reversing switch; operated by a reciprocating part, having its two arms connected to a source of potential, and having two of its contacts connected to one end of the field winding and the other two contacts connected to different points in the field resistance, and an auxiliary switch operated by the reciprocating part and adapted when closed to short-circuit the resistance between the said points; substantially as described.

6. In combination with a reciprocating part, a motor, a generator supplying current to the motor, a generator field resistance connected at one end to a generator field winding;— a two-part two-way reversing switch; operated by a reciprocating part, having its two arms connected to a source of potential, and having two of its contacts connected to one end of the field winding and the other two contacts connected to different points in the field resistance; an auxiliary switch operated by the reciprocating part and adapted when closed to short-circuit the resistance between the said points, and an auxiliary switch adapted just before the end of one of the reciprocations to insert more of the said resistance in the generator field circuit; substantially as described.

7. In combination with a reciprocating part, a motor, a generator supplying current thereto, said generator having a series field winding with a non-inductive resistance in parallel therewith and a field winding with a non-inductive diverting resistance in parallel therewith, a generator field resistance, a source of potential and a reversing switch operated by the reciprocating part, said switch having connections to the source of potential, contacts connected to one end of said field winding and other contacts connected to different points in said field resistance, substantially as described.

8. In combination with a reciprocating part, a motor to actuate said part, a generator to supply current to the motor, a generator field resistance and a switch, operated by the said part, to control and reverse the generator field; an auxiliary switch operated by the said part and adapted to insert said resistance in the generator field circuit during one of the reciprocations; substantially as described.

In testimony whereof, I affix my signature in presence of two witnesses.

GEORGE ERIC MASON.

Witnesses:
O. R. PETERKIN, Jr.,
E. MCBRIDE.

---

Copies of this patent may be obtained for five cents each, by addressing the "Commissioner of Patents, Washington, D. C."